Aug. 23, 1966 W. S. SCHAFFER 3,268,875

TRANSLATION OPERATION

Filed Dec. 20, 1963 3 Sheets-Sheet 1

INVENTOR
WALTER S. SCHAFFER
BY William N. Barret Jr.
ATTORNEY

Aug. 23, 1966 W. S. SCHAFFER 3,268,875

TRANSLATION OPERATION

Filed Dec. 20, 1963 3 Sheets-Sheet 2

United States Patent Office 3,268,875
Patented August 23, 1966

3,268,875

TRANSLATION OPERATION

Walter S. Schaffer, Vestal, N.Y., assignor to International Business Machines Corporation, New York, N.Y., a corporation of New York Filed Dec. 20, 1963, Ser. No. 332,039
2 Claims. (Cl. 340—172.5)

The present invention relates to translators and in particular to a translator capable of translating from any coded representation of a character into any other predetermined coded representative of the same character or a different character.

In the past, translators provided for changing the coded designation of a character in a first code into a coded designation of the same character in a different code have generally been constructed of electrical or mechanical hardware logically arranged to produce a single translational ability.

Flexibility in data processing systems is quite desirable and multiple codes in the communications technology are used for ease in error correction, facility in logic design, storage saving capabilities, etc. The need for a translator capable of achieving multiple translations while keeping costs at a minimum are thus apparent. The translator of the present invention seeks to provide a solution to this problem.

In essence the present invention makes use of an addressable character storage for storing, in individual storage locations, characters in coded bit configuration which will be required as an output in response to a selected address. A character in a bit configuration to be translated is used as a low order part of the address at which bit configuration is stored to be read out as the translated character. Just prior to receipt of incoming data to be translated the high order part of the address is generated and this part is used to select the particular translation to be made. By means of this high order address, groups of low order addresses are made available as tables of translation.

It is, therefore, an object of the present invention to provide an apparatus which in response to a given character represented by a first coded bit configuration generates a character which is the same as the original character or which may be different where the bit configuration is the same as the representing given character or which may be different.

It is a further object of the present invention to provide apparatus which in response to a given control character is operative in response to a given data character represented by a first coded bit configuration to generate the given data character in a different bit configuration.

It is another object of the present invention to provide apparatus for translating data characters which does not require individual apparatus for each individual bit configuration into which said data characters may be translated.

It is a further object of this invention to provide apparatus for translating data characters in which any required translation may be provided without structural modification.

The foregoing and other objects, features and advantages of the invention will be apparent from the following more particular description of a preferred embodiment of the invention, as illustrated in the accompanying drawings.

In the drawings:

FIG. 1, consisting of FIGS. 1*a*, 1*b*, and 1*c*, illustrates the structural details of the invention.

FIG. 2 illustrates how FIGS. 1*a*, 1*b*, and 1*c* are to be arranged to form FIG. 1.

A storage 10 for storing multibit characters at unique addressable locations is shown in FIG. 1*a*. Each address location in storage 10 contains as many bistable devices as the maximum number of bit positions to be used to represent any data character to be contained therein. For example, if it were desirable to have the facility to generate a character using 10 bit positions per character it would be necessary to have 10 bistable devices per address location. An address register 11, FIG. 1*b*, 1*c* is used to select an address in storage 10 by means of matrix switching arrays 12 and 13, FIG. 1*a*.

A buffer register 15, FIG. 1*b*, is connected to an input which may be a memory unit or a transmission line, etc., and contains as many bistable storage elements as required to store the bit configuration of any code which will be received to be translated. A bistable storage element 16 contained in the register 15 is responsive to a control bit $\alpha$ and denotes a character in the buffer 15 to be a control character.

In operation, incoming data appears on an input 17 serially as a parallel bit configuration. At the beginning of each group of related data characters the control character is received in the register 15 and controls circuitry to be hereinafter described to transfer the control character into the higher order positions of address register 11 (thousands and hundreds). Subsequent data characters are set into the lower order of the address register (tens and units).

Before proceeding with a detailed description of the invention the following tables of translation are introduced to facilitate an understanding of the inventive concept.

TABLE 1

| Data Character in Decimal Form | Data Character in 2/5 Bit Configuration | Address of Translated Character | | | | Decimal Equivalent | Character at Location Qui-Binary Bit Configuration | |
|---|---|---|---|---|---|---|---|---|
| | | Control Character | | Data Character | | | | |
| | 6 3 2 1 0 | Th. 8 4 2 1 | Huns. 4 2 1 | Tens 4 2 1 | Units 4 2 1 | | Quinary 0 5 | Binary 0 1 2 3 4 |
| 0 | - - 1 1 - | - - 1 - | - 1 - | - - - | 1 1 - | 2206 | 1 - | 1 - - - - |
| 1 | - - - 1 1 | - - 1 - | - 1 - | - - - | - 1 1 | 2203 | 1 - | - 1 - - - |
| 2 | - - 1 - 1 | - - 1 - | - 1 - | - - - | 1 - 1 | 2205 | 1 - | - - 1 - - |
| 3 | - 1 - - 1 | - - 1 - | - 1 - | - - 1 | - - 1 | 2211 | 1 - | - - - 1 - |
| 4 | - 1 - 1 - | - - 1 - | - 1 - | - - 1 | - 1 - | 2212 | 1 - | - - - - 1 |
| 5 | - 1 1 - - | - - 1 - | - 1 - | - - 1 | 1 - - | 2214 | - 1 | 1 - - - - |
| 6 | 1 - - - 1 | - - 1 - | - 1 - | - 1 - | - - 1 | 2221 | - 1 | - 1 - - - |
| 7 | 1 - - 1 - | - - 1 - | - 1 - | - 1 - | - 1 - | 2222 | - 1 | - - 1 - - |
| 8 | 1 - 1 - - | - - 1 - | - 1 - | - 1 - | 1 - - | 2224 | - 1 | - - - 1 - |
| 9 | 1 1 - - - | - - 1 - | - 1 - | - 1 1 | - - - | 2230 | - 1 | - - - - 1 |

TABLE 2

| Data Character in Decimal Notation | Character Data in Qui-Binary Bit Configuration | | Address of Translated Character | | | | Decimal Equivalent | Character at Location Binary Bit Configuration 8 4 2 1 |
|---|---|---|---|---|---|---|---|---|
| | | | Control Character | | Data Character | | | |
| | Binary 4 3 2 1 0 | Quinary 5 0 | Th. 8 4 2 1 | Huns. 4 2 1 | Tens 4 2 1 | Units 4 2 1 | | |
| 0 | - - - - 1 | - 1 | 1 1 - - | 1 - - | - - - | 1 - 1 | 12405 | - - - - |
| 1 | - - - 1 - | - 1 | 1 1 - - | 1 - - | - - 1 | - - 1 | 12411 | - - - 1 |
| 2 | - - 1 - - | - 1 | 1 1 - - | 1 - - | - 1 - | - - 1 | 12421 | - - 1 - |
| 3 | - 1 - - - | - 1 | 1 1 - - | 1 - - | 1 - - | - - 1 | 12441 | - - 1 1 |
| 4 | 1 - - - - | - 1 | 1 1 - - | 1 - 1 | - - - | - - 1 | 12501 | - 1 - - |
| 5 | - - - - 1 | 1 - | 1 1 - - | 1 - - | - - - | 1 1 - | 12406 | - 1 - 1 |
| 6 | - - - 1 - | 1 - | 1 1 - - | 1 - - | - - 1 | - 1 - | 12412 | - 1 1 - |
| 7 | - - 1 - - | 1 - | 1 1 - - | 1 - - | - 1 - | - 1 - | 12422 | - 1 1 1 |
| 8 | - 1 - - - | 1 - | 1 1 - - | 1 - - | 1 - - | - 1 - | 12442 | 1 - - - |
| 9 | 1 - - - - | 1 - | 1 1 - - | 1 - 1 | - - - | - 1 - | 12502 | 1 - - 1 |

In Table 1, data in 2/5 bit configuration is converted to a qui-binary output while in Table 2, data in qui-binary is converted to straight binary. The format in each table has been illustrated to show:

(1) the data character to be translated, in decimal form, (2) the data character in original bit configuration where "1" indicates a bit and "—" indicates no bit, (3) the address of the translated data character in storage in the bit configuration used by the address register obtained from the original bit configuration (to be described immediately succeeding this enumeration), (4) the decimal equivalent of this address, (5) the original data character in a translated bit configuration.

While the above tables show the data character translated to be the same as the untranslated, this is not a requirement and if the translation required a data character such as "*a*" in 2/5, that could end up "*s*" in binary.

The address of the translated character is obtained from the incoming data character by sensing the bits forming an incoming data character as the bits forming the address digits. In this particular embodiment of the invention the address register utilizes a binary-coded decimal notation. As shown, each order, e.g., 80, FIG. 1*b*, of the address register 11 comprises four binary bit positions 1, 2, 4, 8. To avoid an error if a bit were received in each bit position, only positions 1, 2, 4 are used except in the thousands order, the highest order in this particular embodiment. In the high order, the presence of four bits indicates 15 which is acceptable as the highest order digit but would be an error condition in the lower orders.

The following is an example selected from the tables for detailed consideration:

| Address Register | | Data Character Register With Qui-Binary Characters Decimal 7 |
|---|---|---|
| | | – α |
| Units | 1 | Q0 – B1 |
| | 2 | Q5 1 B2 |
| | 4 | B0 – B3 |
| Tens | 1 | B1 B4 |
| | 2 | B2 B5 |
| | 4 | B3 – B6 |
| Hundreds | 1 | B4 – B7 |
| | 2 | |
| | 4 | |

Here the qui-binary number 6 appears in register 15, FIG. 1*b*, with a bit in elements B2 and B4. B2 and B4 as shown generate an address in the units and tens orders of 12.

The higher order portion of the address was set into the thousands and hundreds order prior to receipt of a data character as follows:

| | | |
|---|---|---|
| | | 1 α |
| Hundreds | 1 | – B1 |
| | 2 | – B2 |
| | 4 | 1 B3 |
| Thousands | 1 | – B4 |
| | 2 | – B5 |
| | 4 | 1 B6 |
| | 8 | 1 B7 |

Here the presence of an α bit gates the control character to the hundreds and thousands order to establish the high order digits of 124. The total address for the above example is 12412 at which location a data character is stored to effect the desired translation.

The number of address locations will necessarily limit the translations which can be made for an input data character. As can be seen from the examples used, there were 13 positions in the address register to which bits from an incoming data character could be applied. In the example used, the maximum number of data bits per character was seven while the selection of a translation table would be limited to the other six bits. For a lesser number of tables, more character bits could obviously be used and vice versa.

*Detailed description*

Figure 1A:
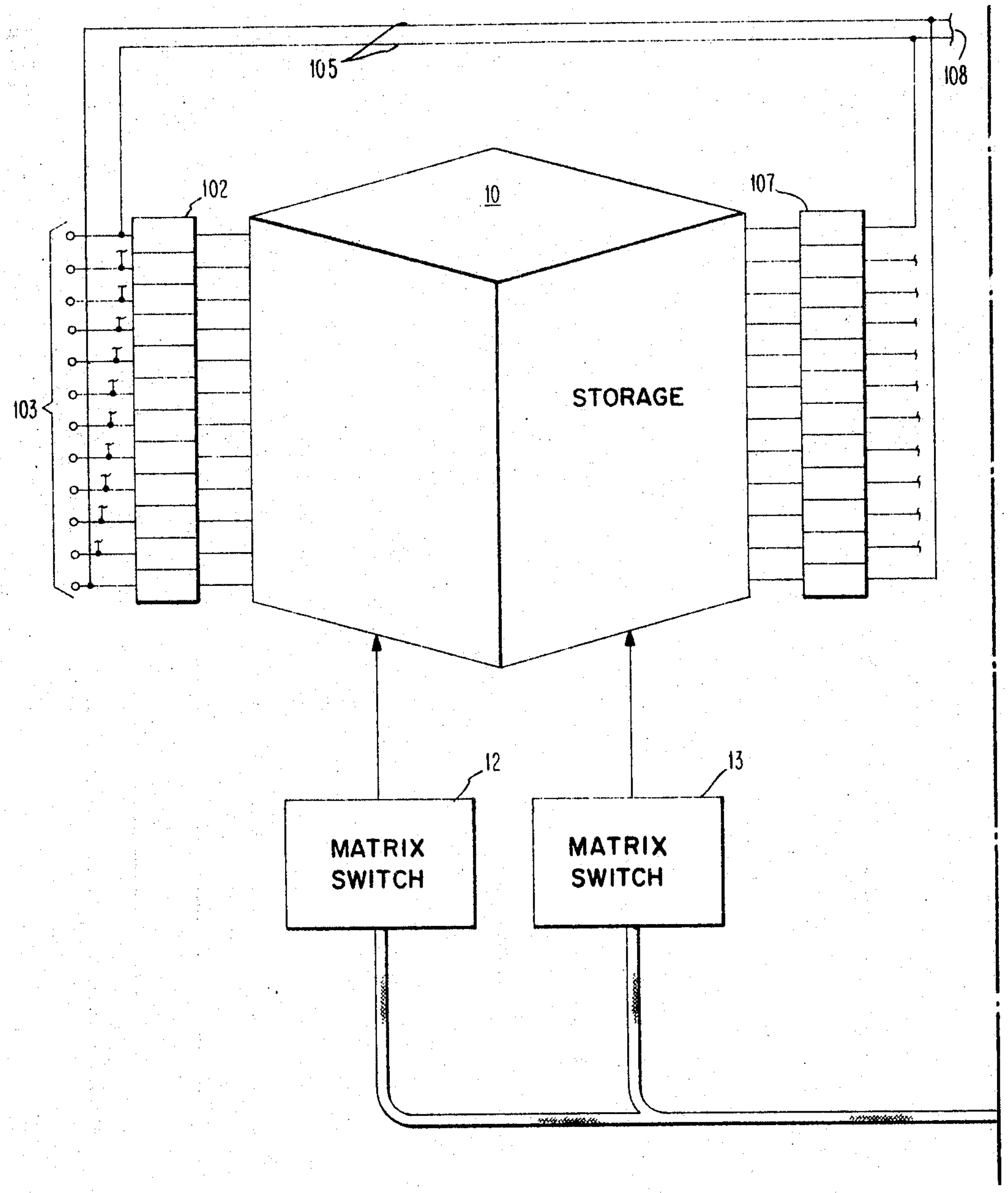
Figure 1B:
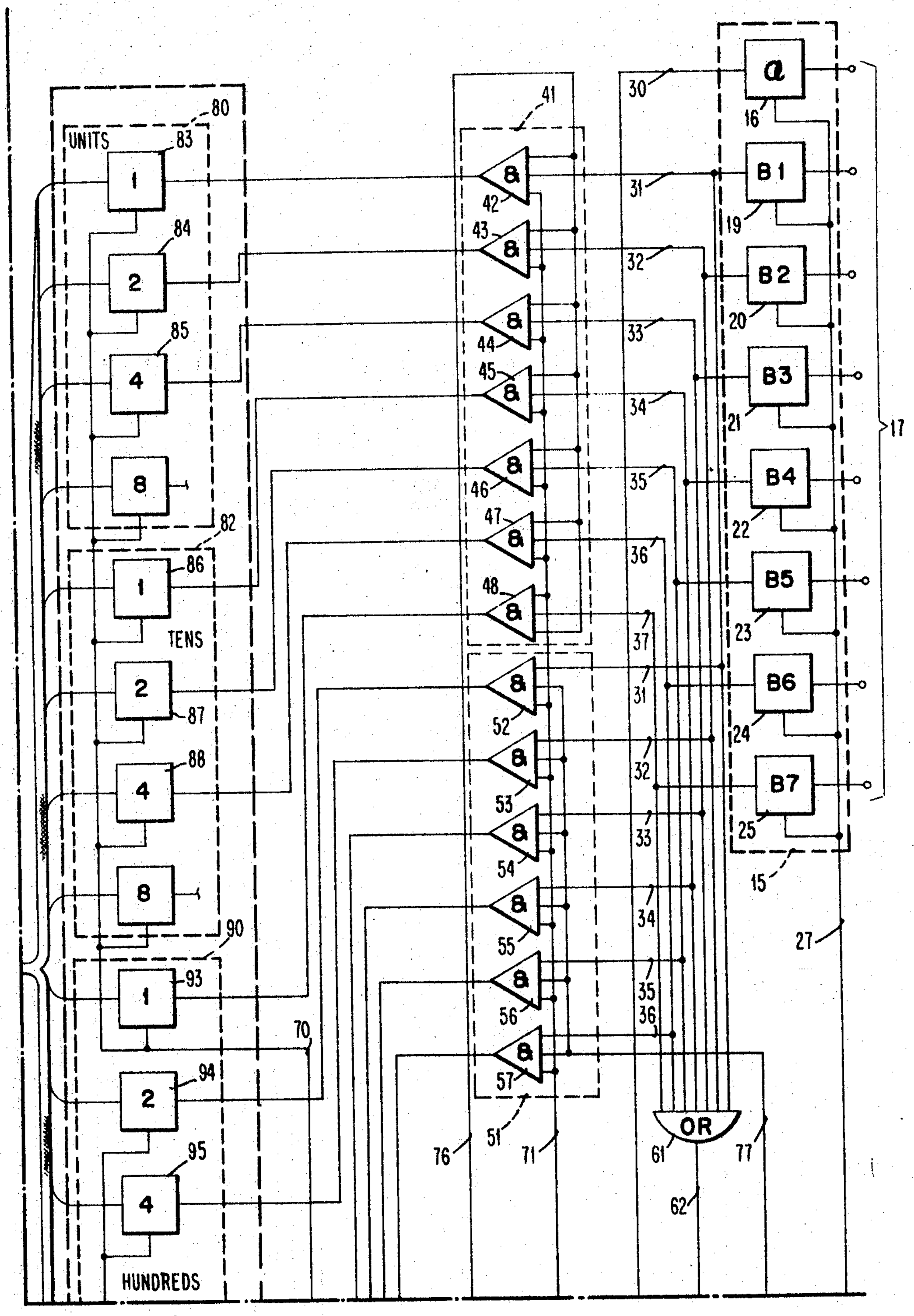

Data on a series of input lines 17, FIG. 1*b*, appears as electrical signals which are utilized to set bistable storage elements 16 and 19–25 to an ON condition when a signal is present on an incoming line. The bistable element could be, for example, a bistable multivibrator. A reset 27 is provided to restore all bistable devices to an OFF condition.

Output signals from the bistable devices appear on conductors 30–37 when a device is in an ON condition. The outputs from bistable devices 19–25 are connected to an OR circuit 61 which provides an output signal on conductor 62 when any bistable device in this specified series is set to an ON condition by a signal on an incoming line 17.

Figure 1C:
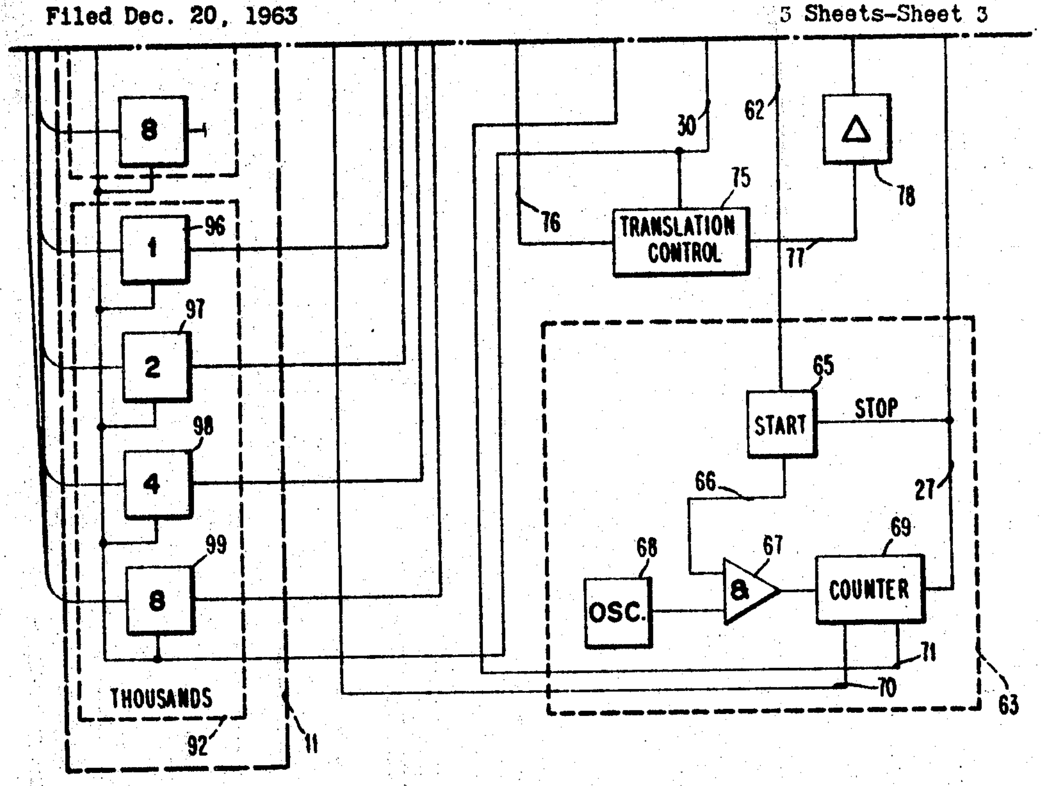
Figure 2:
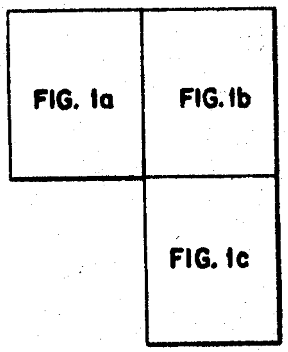

The conductor 62 is supplied to a start control 65, FIG. 1*c*, which may be a bistable multivibrator, to set the same to an ON condition. An output 66 from start control 65 is connected to an AND circuit 67. A continuously running oscillator 68 supplies signals to AND 67 so that when there is a signal on conductor 66 an output will be provided to a counter 69. Counter 69 is of conventional construction and comprises multiple bistable stages (for example 10). An output is provide at 71 from stage 5, for example, at at 27 from stage 10. The output 27 from stage 10 is applied to start control 65 to set it to an OFF condition and drop the signal on line 66 to disable AND circuit 67. The output 27 is, as mentioned previously, also used to reset all bistable devices 16 and 19–25 of register 15, FIG. 1*b*. The output 71 is used to gate the data from register 15 through AND circuit 41 and 51, FIG. 1*b*. A reset 70 is provided from counter 69 at some stage before the stage to which output 71 is connected (for example, 2) for reset portions of address register 11. It is, of course, to be understood that the number of stages or the particular connections are not critical and the numbers herein are used by way of example only.

The circuit elements 65–69 form a clock circuit 63 which is used to detect the presence of a character in register 15. The bits forming a character on input line 17 while in parallel may not occur simultaneously. It is thus necessary to sample the character in register 15 a sufficient time after the first bit of the character has been set into register 15 to insure all bits forming the character will have been received. The signal on conductor 27 is, as explained, the reset for register 15 to prepare the same for the next character on input line 17.

The presence of a control character in register 15 is denoted by the presence of a bit in bistable storage device 16 of register 15. The output of this device is utilized to set a translation control 75, FIG. 1*c*, which may be a bistable multivibrator, to provide a control signal on an output 76 when the control is OFF and a control signal on an output 77 when the control is ON.

The output 76 is supplied as one input to a group of AND circuits 41 while output 77 is supplied through a delay 78 to a group of AND circuits 51. To the group of AND circuits 41, FIG. 1*b*, the outputs from the buffer register 15 are applied as follows: 31–42, 32–43, 33–44, 34–45, 35–46, 36–47, and 37–48. To the group of AND circuits 51 the outputs from the buffer register 15 are connected 31–52, 32–53, 33–54, 34–55, 35–56, and 36–57. A third input to all AND circuits in each group 41 and 51 is the timing signal line 71. In summary, therefore, the output from buffer register 15 is gated either through AND cricuits 41 or 51 as determined by control 75 and timed by clock 63.

The outputs of AND circuits 41 are applied to the units order 80, tens order 82, and also to the hundreds order 90 of the address register 11. In each order of the address register are contained bistable devices, e.g., 83, 84, etc., which when set provide an output indicative of a decimal number as indicated. The connection as shown in such that the data bits contained in register 15 are entered through AND circuits 41 to the bistable devices of the units, tens and hundreds order as follows: B1–83, B2–84, B3–85, B4–86, B5–87, B6–88, B7–93 when the control 75 is providing an output on conductor 76.

When control 75 provides an output on conductor 77 the AND circuits 51 are conditioned by a signal from a delay unit 78 to connect the outputs register 15 as follows: B1–94, B2–95, B3–96, B4–97, B5–98, B6–99. The delay unit 78 may be a passive delay line or an active monostable multivibrator. The purpose of delay 78 is to allow time for the high orders of the address register to be reset prior to setting a new set of digits therein.

The address register 11 provides by means of outputs from each bistable device a coded indication of the address location in storage 10, FIG. 1*a*, which is to be read out. The address register is connected to switches 12 and 13, FIG. 1*a*, which provide a coordinate selection of the storage location. Details of this type of construction may be found in U.S. Patent No. 2,991,454.

Data read from storage 10 is stored in a buffer 102 consisting of as many bistable elements as there are character bits per location. The outputs of buffer 102 are shown as terminals 103. The data stored in buffer 102 is restored to storage 10 by means of conductors 105 and inhibit driver 107 so that the same translated character will still be available at the particular address location selected.

It should be understood that translated data from storage 10 may be re-entered into buffer 15 to effect another translation if desired as indicated by broken connection 108.

While the invention has been particularly shown and described with reference to a preferred embodiment thereof, it will be understood by those skilled in the art that various changes in form and details may be made therein without departing from the spirit and scope of the invention.

What is claimed is:

1. In an apparatus for translating a data character, (a) a data storage device containing a plurality of addressable locations wherein each location contains means for storing a data character as a combination of bit manifestations and being responsive to the selection of said address for transferring therefrom any data character therein, (b) an address register for manifesting address data of the addressable locations within said storage device, (c) a plurality of digit positions within said address register wherein each digit position contains means for storing address data in a first coded notation, (d) means for connecting said address register to said storage device to select an address location within said storage device, (e) means for transferring a data character manifested in a second coded notation to said address register to set said address register wherein said address register will contain data manifested in a second coded notation stored as some arbitrary character as manifested in a first notation, (f) further means for transferring to a high order position of said address register other than the positions which received a character to be translated a further control data character indicative in said first coded notation of the second coded notation, (g) wherein a data character, explicitly related to said data character (e) to be translated, in a third coded notation stored at said address indicated by said arbitrary character (e) will be transferred from said storage device as a translation of said character in a second notation.

2. The apparatus of claim 1 further including (a) a buffer register for receiving data as a plurality of signals representing bits wherein said buffer includes a plurality of bistable devices equal in number to the maximum number of bits to be received, (b) a switching circuit comprising a first and second set of gating elements, each said set of elements connecting the output of each said bistable device in said buffer to the digit positions of said address register, (c) said first set of gating elements being connected to the low order of said address register and said second set of gating devices being connected to the high order of said address register, (d) means responsive to said control character for gating elements to set the high order digit positions of said address register, (e) means responsive to said data character for gating said second set of gating element to set the low order of said address register, (f) wherein an address made up of control character bits and data character bits is utilized to read a position in storage at which a translated data character may be found.

References Cited by the Examiner

UNITED STATES PATENTS

| | | | |
|---|---|---|---|
| 3,111,648 | 11/1963 | Marsh et al. | 340—172.5 |
| 3,187,322 | 6/1965 | Dahlberg | 340—347 |

ROBERT C. BAILEY, *Primary Examiner.*

G. D. SHAW, *Assistant Examiner.*